July 14, 1953 J. D. BOLESKY 2,645,692
THERMOSTATIC CONTROL
Filed Oct. 27, 1949
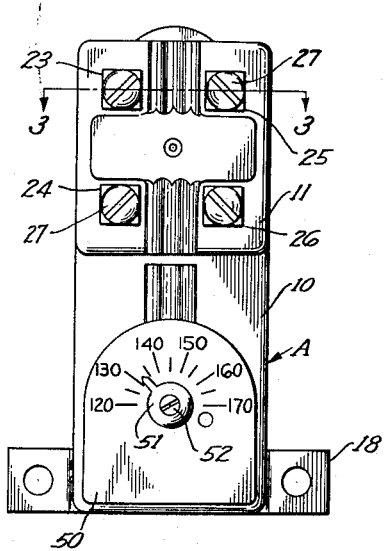
Fig. 1
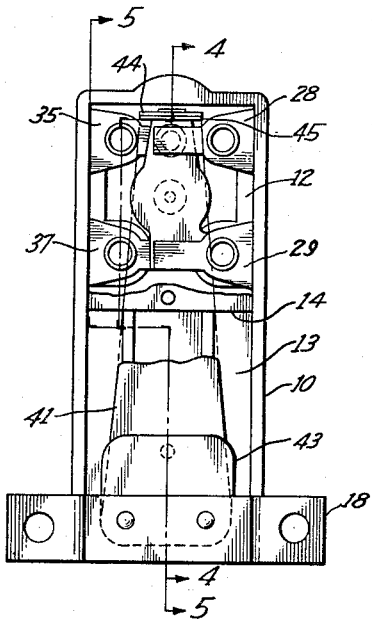
Fig. 2
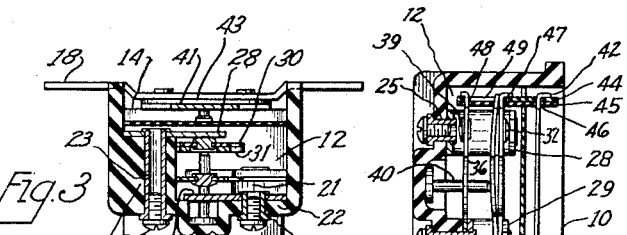
Fig. 3  Fig. 6
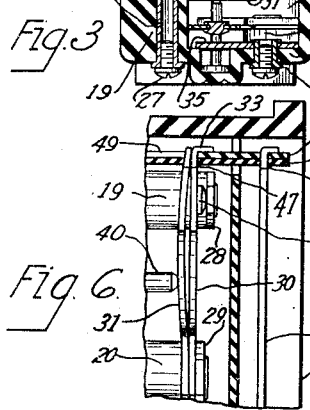
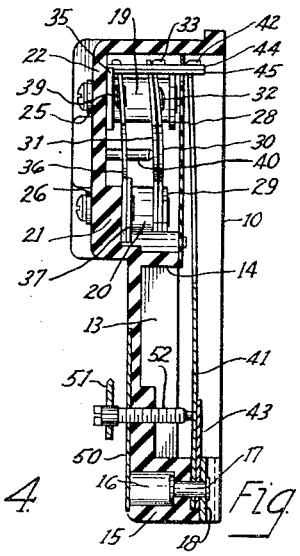
Fig. 4  Fig. 5
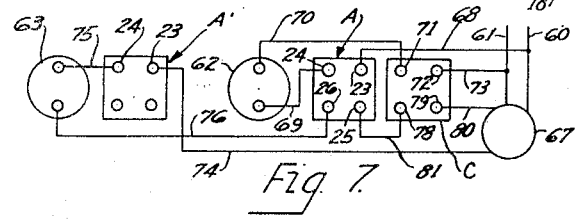
Fig. 7
INVENTOR.
JOHN D. BOLESKY
BY
ATTORNEY.

Patented July 14, 1953

2,645,692

UNITED STATES PATENT OFFICE 2,645,692

THERMOSTATIC CONTROL

John D. Bolesky, Mansfield, Ohio, assignor to Adrian Medert, Cleveland, and Russell W. Bolesky, Mansfield, Ohio, trustees Application October 27, 1949, Serial No. 123,930

8 Claims. (Cl. 200—139)

This invention relates to thermostatic circuit breakers and more particularly to thermostatically controlled switches and the like especially adapted for use in opening and closing the circuit to the electric heating elements of an electric water heater.

Heretofore, several different types of devices have been used for controlling the flow of electric current to the heating elements of an electric water heater, which devices have embodied many drawbacks and undesirable features. For example, such devices were of a relatively complicated structure with a corresponding high cost of manufacture, and were erratic and unreliable in operation in that they were prone to fail or operate at a temperature outside the desired or designated range.

It is among the objects of the present invention to provide a new and novel thermostatically controlled switch for use in connection with electric water heaters which overcomes the drawbacks and undesirable features of prior devices, is of simple construction, uniform in operation within a predetermined temperature range and economical to manufacture.

Another object of the invention is to provide an improved switching mechanism in a thermostatic circuit breaker embodying a non-snapping thermo element and means whereby positive snap actuation of the switch elements is obtained.

Another object of the invention is to provide a thermostatically controlled switch for use in the circuit of an electric hot water heater which will be extremely sensitive and accurate in operation so as to maintain the temperature of the water within the heater or portions thereof within critical desired values.

A still further object of my invention is to provide a thermo-responsive switch device which may be used in one or more circuits or in conjunction with one or more thermo-responsive devices, relays, heating elements and the like.

A still further object of the invention is to provide a thermostatic control device for controlling the flow of current to a plurality of heating elements, whereby such elements may be supplied current either alternately or simultaneously.

These and other objects and advantageous features of the invention not at this time more particularly pointed out will become more apparent as the nature of the invention is better understood from the following detailed description taken in conjunction with the accompanying drawings, wherein like reference characters denote corresponding parts, and wherein:

Figure 1 is a front elevational view of a thermostatic control device embodying the present invention arranged for thermostatically controlling a plurality of electric circuits;

Figure 2 is a rear elevational view of the device shown in Figure 1 with parts thereof broken away;

Figure 3 is a sectional view taken along the line 3—3 of Figure 1;

Figure 4 is a sectional view taken along the line 4—4 of Figure 2 illustrating the normal position of the operative elements of the device;

Figure 5 is a sectional view taken along the line 5—5 of Figure 2 illustrating the position assumed by the elements of the device under the influence of a temperature rise above a preselected value;

Figure 6 is an enlarged detail view of the switch elements;

Figure 7 is a schematic electrical circuit diagram illustrating the device of the present invention when used in the circuit of an electric water heater.

With reference to the accompanying drawing there is illustrated a thermostatically controlled device A embodying a switch mechanism for automatically controlling one or more electrical circuits, made in accordance with the present invention and including a hollow substantially rectangular housing 10, the upper portion thereof having a greater depth and thereby forming on the front face of the housing a rectangular elevation 11. The housing 10 is open at the rear thereof and the interior is divided into two compartments 12 and 13 by means of an upstanding transverse wall 14. The housing is preferably made of an electrical insulating material which is heat resistant to a fair degree, such as a phenolic condensation product or the like. The walls of the housing 10 are substantially of uniform section throughout, with the exception of the lower end 15 which is of greater cross-section and has formed therein counterbores 16 for receiving a suitable fastening means 17 for securing to the housing a mounting bracket 18 which will be more fully described hereinafter.

The compartment 12 is substantially rectangular in configuration and is adapted to house the switching mechanism of the device, being provided with upstanding bosses 19, 20, 21 and 22, adjacent the four corners thereof, suitably apertured to receive terminal posts 23, 24, 25 and 26, respectively. The posts are essentially tubular members having a rectangular head at one end and are arranged to extend through the front wall of the housing, the rectangular heads seating within recesses provided on the front face of the housing. The terminal posts are suitably threaded to receive binding studs 27 for securing lead wires to the terminal posts. Mounted on the upper surface of the boss 19 and secured on the end of the tubular terminal post 23 is a stationary contact arm 28 which is provided with a rectangular extension projecting toward the central portion of the compartment 12 and formed with a contact surface on the lower face thereof. Similarly positioned on the boss 20 and secured to the end of terminal post 24 is a supporting arm 29.

Mounted between the surface of the boss 20 and the inner surface of the arm 29 in superimposed relation are flexible current carrying member 30 and snap element 31. These members are formed with one portion which conforms to the configuration of the supporting arm 29 and a leg portion extending at right angles thereto and arranged to bridge the space between the contact arm 28 and supporting arm 29. The leg portion of the member 30 is formed with a central circular portion terminating in an extension thereof upon which a contact button 32 is mounted. The end of the extension is formed with an upturned tab 33, the purpose of which will be described hereinafter. The contact button 32 engages with the under surface of the terminal arm 28 to complete a circuit from the terminal post 23, through contact arm 28, current carrying member 30 to terminal post 24.

The snap element 31 is shaped similarly to the current carrying member 30 with the exception that the upturned tab at the free end thereof is omitted. The element 31 is suitably dished at its central portion and when in juxtaposition to the member 30 engages the same only at the outer free end thereof. The outer free end of the element 31 bears against the upper current carrying member 30 at its contact point with sufficient pressure to maintain the contact button 32 in contact with the arm 28 and when caused to be moved, does so with a snap action as will be hereinafter described. The concavity of the member 31 may be varied whereby different operating characteristics of the device may be obtained to suit varying requirements.

Mounted on the upper surface of the boss 22 and secured to the inner end of the terminal post 25 is a contact arm 35 provided with a rectangular extension which projects into the central portion of the compartment 12 in vertical alignment with the contact member 28. Mounted on the upper surface of the boss 21 and secured to the inner end of the terminal post 26 is a current carrying member 36, the transverse portion of which is supported by a terminal arm 37 suitably positioned in vertical alignment with the member 29. The current carrying member 36 is provided with a longitudinally extending portion which bridges the space between the terminal arm 37 and the contact arm 36. The free end of the member 36 is provided with a downturned lip. Adjacent the free end of the member 36 is a contact button 39, the surface of which lies in the same plane as the contact surface of the contact arm 35 and engages the latter. The circuit through this part of the switching mechanism is from terminal post 23, contact arm 35, contact button 39, current carrying member 36 to terminal post 26.

Threadably mounted through an aperture centrally disposed in the front wall of the elevated portion 11 of the housing 10, passing through a central aperture in the current carrying member 36 and adapted to engage the lower surface of the element 31 is a post 40 which may be adjusted to effect different predetermined pressures against the dished surface of the element 31 whereby the latter may react with different pressures against the movement of the current carrying member 30. The element 31 is contoured to effect a snap action between the contact button 32 and contact member 28 upon the opening or closing of the circuit thereacross.

The mounting bracket 18 is made of a heat conducting metallic strip and is formed with an offset midsection which is received in a notched portion formed on the lower end of the rear face of the housing 10. The rear surfaces of the outwardly extending ends or ears of the mounting bracket 18 lie substantially flush with the edge surfaces of the end wall 15 so that the rear face of the housing 10 will lie snugly against the water heater tank upon which it may be mounted.

A bi-metallic thermo-responsive element 41 tapered in form is secured at one end to the lower portion of the housing 10 by means of the fastening members 17. The element 41 extends longitudinally of the housing 10 traversing the open rear face of the housing and terminates in an upstanding ear 42 in a plane extending substantially through the upstanding ears formed on the members 30 and 36. A stiffening plate 43 made of spring material and given a permanent set is superimposed on the element 41 and is secured by means of the fastening members 17 adjacent the lower end of the bi-metallic element 41. The bi-metallic member is arranged so that upon a rise in temperature the outer free end thereof is caused to bend or move inwardly into the compartment 12.

A pair of connecting members 44 and 45 suitably made of an electrical insulating material serve to connect the free ends of the bi-metallic element 41 and the current carrying members 30 and 36 for simultaneous movement. The members 44 and 45 are provided with aligned slots 46 through which the free end of the bi-metal member extends. The member 45 is provided with a slot 47 for receiving the end of the members 30 and 31 and a slot 48 for receiving the end of member 36. The member 44 is provided with a cutaway portion 49 which aligns with the slots 47 and 48 and receives the upturned end of the member 30 and the downturned end of the member 36. The arrangement thus provided allows for the minimum amount of play between the various members. Upon being subjected to a temperature above a predetermined value the free end of the bi-metallic element 41 moves inwardly with respect to the housing 10, carrying therewith the connecting members 44 and 45. The free ends of current carrying members 30 and 36 and snap element 31 which are projected through connecting members 44 and 45 are simultaneously moved inward with said connecting members. The snap element 31 resists the movement of the current carrying member 30 until the force of the bi-metallic element exceeds the pressure of the snap element 31, at which point the dished surface of the member snaps into a position of opposite concavity about the point of contact of the end of the post 40 with the lower surface of the snap element 31 and the concave side of said snap element now faces the front of the housing 10. The contact button 32 separates from the contact element 28 with a snap action. The button 32 being mounted on the free end of current carrying member 30 which is anchored at a point spaced from contact 28 is moved in an arc and the surface of the button moved angularly with respect to contact surface 28 effecting a wiping action between the two and assuring a clean make and break between the contacts.

Mounted on the face of the housing 10 is a dial 50 provided with a series of graduations. An indicating pointer 51 is mounted on the outer end of shaft 52. The inner end of the shaft 52 bears against the bi-metal element 41. The shaft is threaded through the front wall of the housing 10 and is effective to exert different degrees of pressure upon the bi-metallic element 41 which are calibrated with respect to the temperature range of the device so that a temperature setting may be made at which the bi-metal element will act to move the end of the current carrying member and interrupt the circuits through the device.

The thermostatically controlled switch of the present invention is particularly designed for use with devices such as hot water heaters employing electric current for heating purposes, serving to automatically control the flow of current to the heating elements at such times as the temperature of the water falls below or exceeds a predetermined temperature range. With reference to Figure 7 of the drawing, the thermostatic control device of my invention is schematically illustrated in the electric circuit of a water heater employing upper and lower heating elements. The numerals 60 and 61 designate power lines and numerals 62 and 63 indicate diagrammatically an electric heating element located in the upper part of the water tank and an electric heating element located in the lower part of the water tank, respectively. For purposes of safety a high limit switch C is placed in the circuit to assure that the flow of current is interrupted in the event that the temperature of the water within the tank exceeds a predetermined value.

The electric heating element 62 is connected with the current supply through control device A, the latter operating only in case the hot water is almost all exhausted from the tank. The electric heating element 63 is connected through a second control device A', control device A, through off-peak meter 67 to the current supply line and functions usually at night on off-peak load to heat the water throughout the entire tank. A conductor 68 connects the power line 60 to terminal post 23 of the control device A and a conductor 69 connects the terminal 24 of switch A with one terminal of the heating element 62. The other terminal of heating element 62 is connected by conductor 70 to one terminal 71 of the high limit switch C. The other terminal 72 of the switch is connected by conductor 73 to the power line 61. The terminal 23 of control device A' is connected to the line 61 through off-peak meter 67 and through conductor 74, and terminal 26 of device A' is connected to one terminal of heating element 63 through conductor 75. The other terminal of heating element 63 is connected to terminal 26 of device A through conductor 76 and terminal 25 of said device is connected to terminal 78 of high limit switch C through conductor 81, the opposite terminal 79 of the high limit switch being connected to power line 60 through off-peak meter 67 and conductor 80.

Tracing the circuit with the contacts of high limit switch closed and the contacts across terminals 23 and 24 of device A, also closed, it will be seen that power passes from power line 60 through conductor 68 to terminal 23 of device A, from contact element 28 thereof through current conducting member 30 to terminal 24, through conductor 69 to one terminal of heating element 62, from heating element 62 through conductor 70 to terminal 71 of switch C, and from the opposite terminal 72 of said switch through conductor 73 to power line 61. This circuit is usually in operation only during the peak period of the day and the heating element thereof being located in the upper region of the tank, only a portion of the water in the tank is heated, which is sufficient to handle nominal demands on the tank. As hot water is drawn off and the temperature of the water falls below a predetermined value the circuit through heating element 62 is closed automatically and current flows until a predetermined temperature in the water is attained.

When the temperature of that portion of the tank serviced by heating element 62 exceeds a predetermined temperature the outer free end of thermo-responsive element 41 of device A moves inwardly, breaking the contact between contact 28 and button 32 and closing the circuit across contact button 39 and contact element 22 between terminals 25 and 26. Unless the switch controlling the off-peak meter is closed, heating of the water is confined to heating element 62. When such switch is closed and device A has acted to open the circuit through heating element 62, current then flows from power line 60 through off-peak meter 67, through conductor 80, across terminals 79 to 78 of high limit switch C, through conductor 81 to terminal 25 of device A, through current carrying member 36 of said device to terminal 26, through conductor 76 to heating element 63, from heating element 63 through conductor 75 to terminal 24 of device A', through current carrying member 30 of said device to conductor 23, through conductor 74 to off-peak meter 67 and power line 61. Current continues to flow through this circuit until the water throughout the entire tank has reached a predetermined temperature at which point the thermo-responsive element 41 of switch A' opens the circuit through this switch and interrupts the flow of current. The switch control A' automatically functions throughout the off-peak period to maintain the temperature of the water throughout the entire tank at a predetermined temperature, re-establishing the circuit at such time as the temperature of the water falls below predetermined value.

Having thus described my invention so that those persons skilled in the art may understand and practice the same, what I desire to obtain by Letters Patent is embodied in the appended claims.

I claim:

1. A thermostatic control device comprising a housing, spaced electrical terminals mounted within said housing, a current carrying member bridging the space between said terminals, said current carrying member being secured to one of said terminals and movable with respect to the other terminal, a snap element juxtapositioned below and freely movable with said current carrying member and adapted to engage and exert pressure against the free end thereof and maintain said end in engagement with the adjacent terminal and a thermo-responsive member arranged to act against the force of said snap element to move the free end of said current carrying member away from said other terminal when the device is subjected to a temperature of a predetermined value.

2. A thermostatic control device comprising a housing, a fixed contact member mounted in said housing, a flexible current carrying member anchored at a point spaced from said fixed contact and carrying a contact button on its free end adapted to engage said fixed contact, a bi-metallic member operable to move the free end of said current carrying member to angularly disengage the contact button and fixed contact whereby a wiping action is obtained between the contact button and the surface of the contact member upon disengagement thereof, and a snap element continuously bearing against said current carrying member, said snap element having one end anchored and the other end slidably engaging the free end of the current carrying member and arranged to act in opposition to said bi-metallic member.

3. A thermostatic control device comprising a housing, spaced electrical terminals mounted within said housing, a current carrying member anchored to one of said terminals and bridging the space between the terminals, said member having a contact button at its free end engageable with one terminal, a snap element continuously bearing against said current carrying member, said snap element having one end anchored and the other end slidably engaging the free end of the current carrying member and adapted to exert pressure against the upper member at its free end to maintain the contact button in engagement with the said terminal, and a thermo-responsive member engageable with the end of the current carrying member and arranged to act in opposition to said snap element to move the free end of said current carrying member away from said other terminal when the device is subjected to a temperature of a predetermined value.

4. A thermostatic control device comprising a housing, spaced electrical terminals mounted within said housing, a current carrying member bridging the space between said terminals, said current carrying member being secured at one end to one of said terminals with the free end thereof movable with respect to the other terminal, a dished snap element having a portion thereof secured to one of the terminals slidably engaging and exerting force against the free end of the current carrying member in one direction, and a thermo-responsive member having one end anchored in said housing and the free end terminating adjacent the free end of said current carrying member and acting in opposition to the said snap element, the free end of said thermo-responsive member being arranged to move when subjected to a temperature of a predetermined value, and means for connecting the end of said thermo-responsive member and said current carrying member for simultaneous movement.

5. A thermostatic control device comprising a housing, spaced electrical terminals mounted within said housing, a current carrying member having a snap element contiguous thereto and bridging the space between said terminals, said current carrying member being secured at one end to one of said terminals with the free end thereof arranged to move angularly with respect to the contact surface of the other terminal, the snap element having one end attached to one of the terminals and being arranged to have its outer free end slidably engage and exert pressure against the current carrying member to maintain engagement of the contact button thereon with the contact surface of said other terminal and a thermo-responsive member adapted to act against the force exerted by the snap element to effect a snap action in separating the said contact button and contact surface.

6. A thermostatic control device comprising a housing, two sets of spaced electrical terminals mounted within said housing, current carrying members bridging the space between each set of terminals, said current carrying members being secured at one end to a terminal and the free ends thereof movable with respect to another terminal, a thermo-responsive member, means for connecting the free ends of said current carrying members and said thermo-responsive member, said thermo-responsive member arranged to move the free ends of said current carrying members when subjected to a temperature of a predetermined value, and a snap element, having one end attached to one of said terminals and arranged to slidably engage and exert force against the free end of one of said current carrying members whereby the thermo-responsive member upon reaching said predetermined value will open the circuit through said current carrying members with a snap action.

7. A thermostatic control device comprising a housing, spaced electrical terminals mounted within said housing, a current carrying member bridging the space between said terminals, said current carrying member being secured to one of said terminals with the free end movable with respect to the other terminal for making and breaking a circuit therebetween, a snap action member contiguous with said current carrying member, said member being dish shaped and secured at one end to said other terminal and having its free end in slidable engagement with the free end of the current carrying member for urging the same into engagement with said other terminal, and a thermo-responsive member arranged to move the free end of said current carrying member in opposition to said snap action means away from said other terminal when subjected to a temperature of a predetermined value.

8. A thermostatic control device comprising a housing, two sets of spaced electrical terminals mounted within said housing, a pair of current carrying members bridging the space between said terminals, said current carrying members being secured to one of said terminals and movable with respect to the other terminal, snap action means having a portion thereof attached to one of said terminals and slidably engageable with one of said current carrying members for urging the free end thereof into engagement with its terminal, a thermo-responsive member arranged to act in opposition to said snap action means to move the free ends of said current carrying members when subjected to a temperature of a predetermined value, said current carrying members and thermo-responsive member being arranged so that the circuit is opened across one set of terminals and closed across the other set in response to movement of the thermo-responsive member.

JOHN D. BOLESKY.

References Cited in the file of this patent

UNITED STATES PATENTS

| Number | Name | Date |
|---|---|---|
| 1,622,721 | Hook | Mar. 29, 1927 |
| 1,797,886 | Thomas | Mar. 24, 1931 |
| 1,941,540 | Denison et al. | Jan. 2, 1934 |
| 1,969,974 | Erickson | Aug. 14, 1934 |
| 2,002,467 | Blodgett | Mar. 21, 1935 |
| 2,272,021 | Riche | Feb. 3, 1942 |
| 2,361,202 | Hodgkins | Oct. 24, 1944 |
| 2,394,920 | Kronmiller | Feb. 12, 1946 |
| 2,414,315 | McCullough | Jan. 14, 1947 |
| 2,446,307 | Shaw | Aug. 3, 1948 |
| 2,513,053 | Roswell | June 27, 1950 |